UNITED STATES PATENT OFFICE.

JOSEPH KEMPNER, OF GÖRLITZ, PRUSSIA.

IMPROVEMENT IN THE MANUFACTURE OF MILK OR ALABASTER GLASS.

Specification forming part of Letters Patent No. 210,331, dated November 26, 1878; application filed November 15, 1878.

*To all whom it may concern:*

Be it known that I, JOSEPH KEMPNER, of the city of Görlitz, in the Kingdom of Prussia, have invented certain Improvements in the Manufacture of Milk or Alabaster Glass, of which the following is a specification:

The object of the present invention is to dispense with the use of the whitening materials heretofore employed in the manufacture of the kind of glass known as "milk glass," "fusible porcelain," "alabaster glass," "cryolite glass," or "opaline," these materials being generally phosphate of lime, peroxide of tin, and cryolite.

In carrying out my invention, I combine with the ordinary glass materials—soda, potash, and sand—a mixture consisting of feldspar, fluor-spar, and heavy spar, or, instead of the latter, witherite, in the manner and proportions hereinafter mentioned.

The mixture generally used and added to the glass materials, and fused therewith, consists of feldspar, twenty to seventy-eight parts; fluor-spar, seventeen to sixty parts; and heavy spar, five to forty parts. One hundred parts weight of this mixture are added to the glass mass, consisting of ten to seventy parts weight high-grade soda, or fifteen to one hundred parts weight of potash, and seventy to three hundred parts weight of sand.

In the fusion of the materials it is advisable to maintain the soda scum in a stable state, and to regulate the greater or less consistency of the mass by increasing or lessening the scum which collects at the rim of the fusing-pot. The admixture of heavy spar ($BaSO_4$) will increase the density and polish of the glass; but care must be taken that the glass is not made too dense by a too large use of the heavy spar. It will be found that four parts weight of heavy spar are proportioned to five parts weight of soda, or six and a half parts weight of potash, in order to produce the most satisfactory quality of glass possessing the requisite characteristics of density, polish, and high refracting power.

Glass produced in the manner mentioned at once possesses the required milky or semi-translucent appearance, and in the molding, blowing, or other manipulation thereof it does not require to be rewarmed, as it cools or sets less rapidly than glass made in the ordinary manner.

I may state that I use the ordinary decoloring means employed in processes for producing glass of the present description; and, furthermore, I add charcoal to five to six parts of the heavy spar.

I also propose to employ, instead of this last-mentioned material, and in connection with the other ingredients heretofore mentioned, the material known as "witherite" ($BaCO_3$) in the same proportions as the heavy spar is used. Three parts weight of witherite are proportioned to five parts weight of soda, or six and a half parts weight of potash. When witherite is employed it will not be necessary to use the charcoal, as above mentioned.

Having thus described my invention, what I claim as new, and desire to secure by Letters Patent, is—

1. The method of producing milk or alabaster glass, consisting in the admixture of feldspar, fluor-spar, and heavy spar with the ordinary glass materials, and fusing therewith, as and for the purpose set forth.

2. The method of producing milk or alabaster glass, consisting in the admixture of feldspar, fluor-spar, and witherite with the ordinary glass materials, and fusing therewith, as and for the purpose set forth.

In testimony whereof I have signed my name to this specification in the presence of two subscribing witnesses.

JOSEPH KEMPNER.

Witnesses:
JOHANNES BRANDT,
BERTHOLD ROI.